United States Patent
Kodaka et al.

(10) Patent No.: US 10,427,465 B2
(45) Date of Patent: Oct. 1, 2019

(54) PNEUMATIC TIRE

(71) Applicant: Sumitomo Rubber Industries, Ltd., Kobe-shi, Hyogo (JP)

(72) Inventors: Kazuma Kodaka, Kobe (JP); Toshiyuki Nakano, Kobe (JP); Keita Nakano, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 369 days.

(21) Appl. No.: 15/220,881

(22) Filed: Jul. 27, 2016

(65) Prior Publication Data
US 2017/0036487 A1 Feb. 9, 2017

(30) Foreign Application Priority Data
Aug. 3, 2015 (JP) ................................. 2015-153492

(51) Int. Cl.
*B60C 11/03* (2006.01)

(52) U.S. Cl.
CPC ........ *B60C 11/0304* (2013.01); *B60C 11/032* (2013.01); *B60C 2011/0341* (2013.01); *B60C 2011/0365* (2013.01); *B60C 2011/0381* (2013.01)

(58) Field of Classification Search
CPC ......... B60C 11/0304; B60C 2011/0381; B60C 2011/0383; B60C 11/032
USPC ..................................................... 152/209.8
See application file for complete search history.

(56) References Cited

U.S. PATENT DOCUMENTS

| | | | | |
|---|---|---|---|---|
| 3,637,001 A | * | 1/1972 | Roberts | B60C 11/0306 152/209.11 |
| 2006/0254684 A1 | * | 11/2006 | Tamura | B60C 11/0306 152/209.18 |

FOREIGN PATENT DOCUMENTS

| | | | |
|---|---|---|---|
| CA | 1159345 | * | 12/1983 |
| DE | 102007051645 | * | 4/2009 |
| EP | 1314581 A1 | | 5/2003 |
| GB | 2 401 588 A | | 11/2004 |
| JP | 02-169306 | * | 6/1990 |
| JP | 05-077613 | * | 3/1993 |

(Continued)

OTHER PUBLICATIONS

English machine translation of JP08-16471. (Year: 1996).*

(Continued)

*Primary Examiner* — Robert C Dye
(74) *Attorney, Agent, or Firm* — Birch, Stewart, Kolasch & Birch LLP

(57) ABSTRACT

A pneumatic tire include a tread portion with a designated installing direction to a vehicle to define an outboard tread edge and an inboard tread edge, the tread portion including an inboard portion defined between the inboard tread edge and a tire equator and an outboard portion defined between the outboard tread edge and the tire equator. The inboard portion is provided with a circumferentially and continuously extending first main groove and a circumferentially and continuously extending second main groove arranged between the first main groove and the inboard tread edge. An axial distance from the tire equator to a centerline of the second main groove is in a range of from 0.35 to 0.75 times of a width of the inboard portion. No circumferentially and continuously extending main grooves are provided with the outboard portion.

12 Claims, 5 Drawing Sheets

(56) References Cited

FOREIGN PATENT DOCUMENTS

| JP | 08-16471 | * | 6/1996 |
| JP | 2004-338628 A | | 12/2004 |
| JP | 2006-062469 | * | 6/2006 |
| JP | 2010-179896 | * | 8/2010 |
| WO | WO 2012/042468 A1 | | 4/2012 |
| WO | WO2014/167990 | * | 10/2014 |
| WO | WO2015129139 | * | 9/2015 |

OTHER PUBLICATIONS

Engish machine translation of DE102007051645. (Year: 2009).*
English machine translation of JP2006-062469. (Year: 2006).*
English machine translation of JP05-077613. (Year: 1993).*
English machine translation of JP02-169306. (Year: 1990).*
Extended European Search Report, dated Jan. 4, 2017, for European Application No. 16180329.1.

\* cited by examiner

PNEUMATIC TIRE

BACKGROUND ART

Field of the Invention

The present invention relates to pneumatic tires, and in particular relates to a pneumatic tire capable of improving wet performance, uneven wear resistance and steering stability in cornering in good balance.

Description of the Related Art

Japanese Unexamined Patent Application Publication No. 2004-338628 discloses a racing pneumatic tire usable for public roads, for example. The racing pneumatic tire includes a tread portion provided with only a single circumferentially and continuously extending main groove on an inboard portion between the tire equator and an inboard tread edge in order to ensure wet performance on public roads.

Unfortunately, the racing pneumatic tire disclosed in the publication is apt to have poor wet performance.

SUMMARY OF THE INVENTION

In view of the above problems in the conventional art, the present invention has an object to provide a pneumatic tire capable of improving wet performance, uneven wear resistance and steering stability in cornering in good balance.

According to one aspect of the invention, a pneumatic tire includes a tread portion having a designated installing direction to a vehicle to define an outboard tread edge and an inboard tread edge. The tread portion includes an inboard portion defined between the inboard tread edge and a tire equator and an outboard portion defined between the outboard tread edge and the tire equator. The inboard portion is provided with a circumferentially and continuously extending first main groove and a circumferentially and continuously extending second main groove arranged between the first main groove and the inboard tread edge. An axial distance from the tire equator to a centerline of the second main groove is in a range of from 0.35 to 0.75 times of a width of the inboard portion. No circumferentially and continuously extending main grooves is provided with the outboard portion.

According to another aspect of the invention, the inboard portion may be provided with a plurality of first lateral grooves extending axially inwardly from the inboard tread edge and terminating without reaching the second main groove.

According to another aspect of the invention, the first lateral grooves may extend straightly along an axial direction of the tire.

According to another aspect of the invention, the tread portion may be further provided with a plurality of second lateral grooves each having one end in communication with the first main groove and the other end terminating within the outboard portion.

According to another aspect of the invention, the tread portion may be further provided with a plurality of second lateral grooves each having one end in communication with the first main groove and the other end terminating within the outboard portion, and the second lateral grooves may be arranged at circumferential pitches greater than circumferential pitches of the first lateral grooves.

According to another aspect of the invention, the tread portion may be further provided with a plurality of second lateral grooves each having one end in communication with the first main groove and the other end terminating within the outboard portion, and the second lateral grooves may have axial lengths smaller than axial lengths of the first lateral grooves.

According to another aspect of the invention, the second lateral grooves may extend straightly along an axial direction of the tire.

According to another aspect of the invention, the inboard portion may include a plain rib between the first main groove and the second main groove, and the plain rib may not be provided with any grooves nor sipes.

According to another aspect of the invention, the outboard portion may include a slick pattern that is not provided with any grooves nor sipes except the second lateral grooves.

According to another aspect of the invention, a pneumatic tire includes a tread portion having a designated installing direction to a vehicle to define an outboard tread edge and an inboard tread edge. The tread portion includes an inboard portion defined between the inboard tread edge and a tire equator and an outboard portion defined between the outboard tread edge and the tire equator. The inboard portion is provided with a circumferentially and continuously extending first main groove, a circumferentially and continuously extending second main groove arranged between the first main groove and the inboard tread edge, and a plurality of second lateral grooves extending toward the outboard tread edge from the first main groove. An axial distance from the tire equator to a centerline of the second main groove is in a range of from 0.35 to 0.75 times of a width of the inboard portion. No circumferentially and continuously extending main grooves are provided with the outboard portion.

DESCRIPTION OF THE PREFERRED EMBODIMENTS

Figure 1:
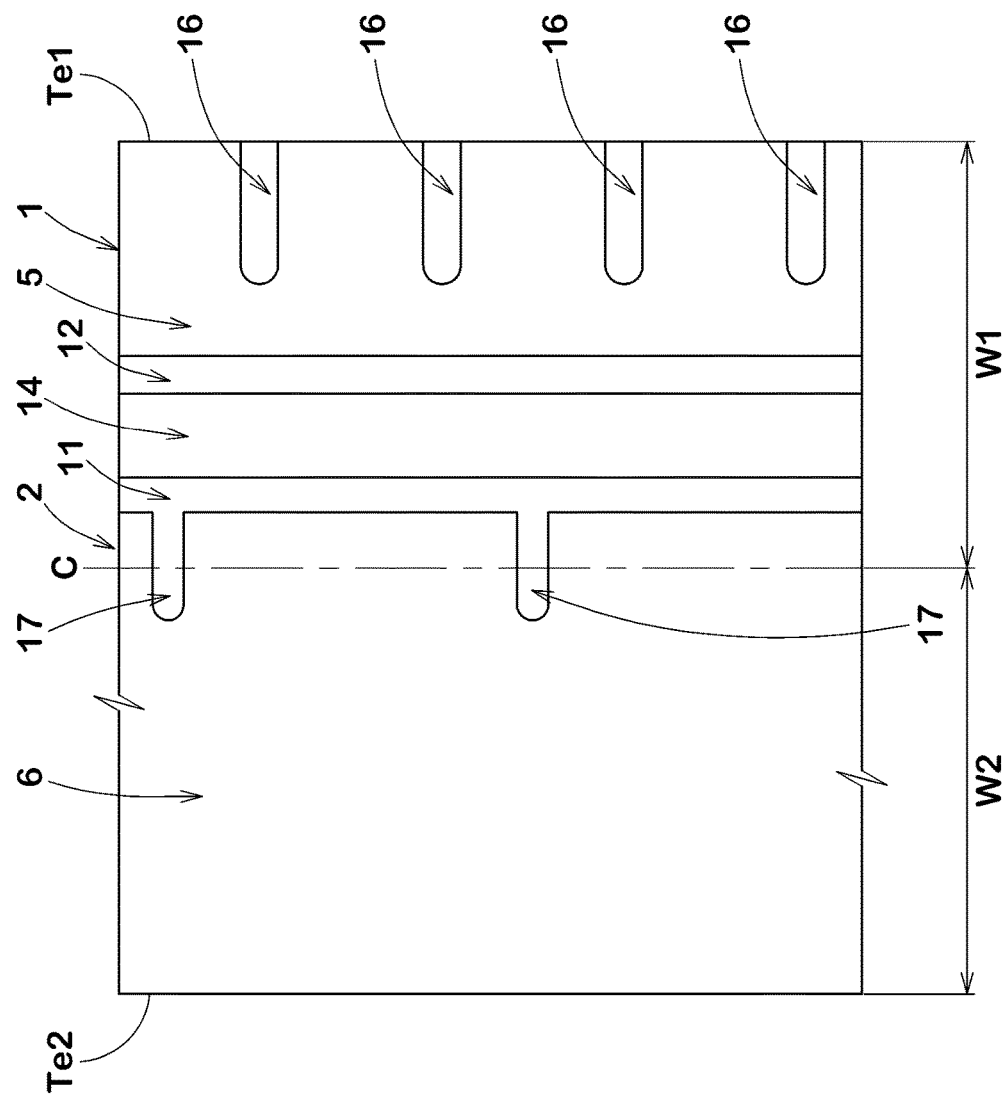
FIG. 1 is a development view of a tread portion of a pneumatic tire according to an embodiment of the present invention.

An embodiment of the present invention will be explained below with reference to the accompanying drawings. FIG. 1 illustrates a development view of a tread portion 2 of a pneumatic tire (hereinafter, it may be simply referred to as a "tire") 1 according to an embodiment of the present invention. The tire 1 according to the embodiment, for example, is suitably used for passenger cars, and is configured as a high performance tire that is intended to use not only public roads but also a race circuit.

The tread portion 2 includes a tread pattern having a designated installing direction to a vehicle. The installing direction may be indicated on a sidewall portion (not illustrated) and the like using a mark or characters. In FIG. 1, the right side corresponds to an inboard side and the left side corresponds to an outboard side when the tire 1 is installed on a vehicle.

By being designated the installing direction to a vehicle, the tread portion 2 includes an inboard tread edge Te1 which is intended to be located on the inboard side of a vehicle upon installed to the vehicle and an outboard tread edge Te2 which is intended to be located on the outboard side of the vehicle upon installed to the vehicle.

The tread edges Te1 and Te2 are axially outermost inboard and outboard edges on a ground contact patch of the tread portion 2 under a loaded condition of the tire. The loaded condition is such that the tire 1 is mounted on a standard wheel rim (not illustrated) with a standard pressure, and is grounded with a standard tire load at a camber angle of set to zero.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

The tread portion 2 includes an inboard portion 5 formed between the tire equator C and the inboard tread edge Te1, and an outboard portion 6 formed between the tire equator C and the outboard tread edge Te2.

Figure 2:
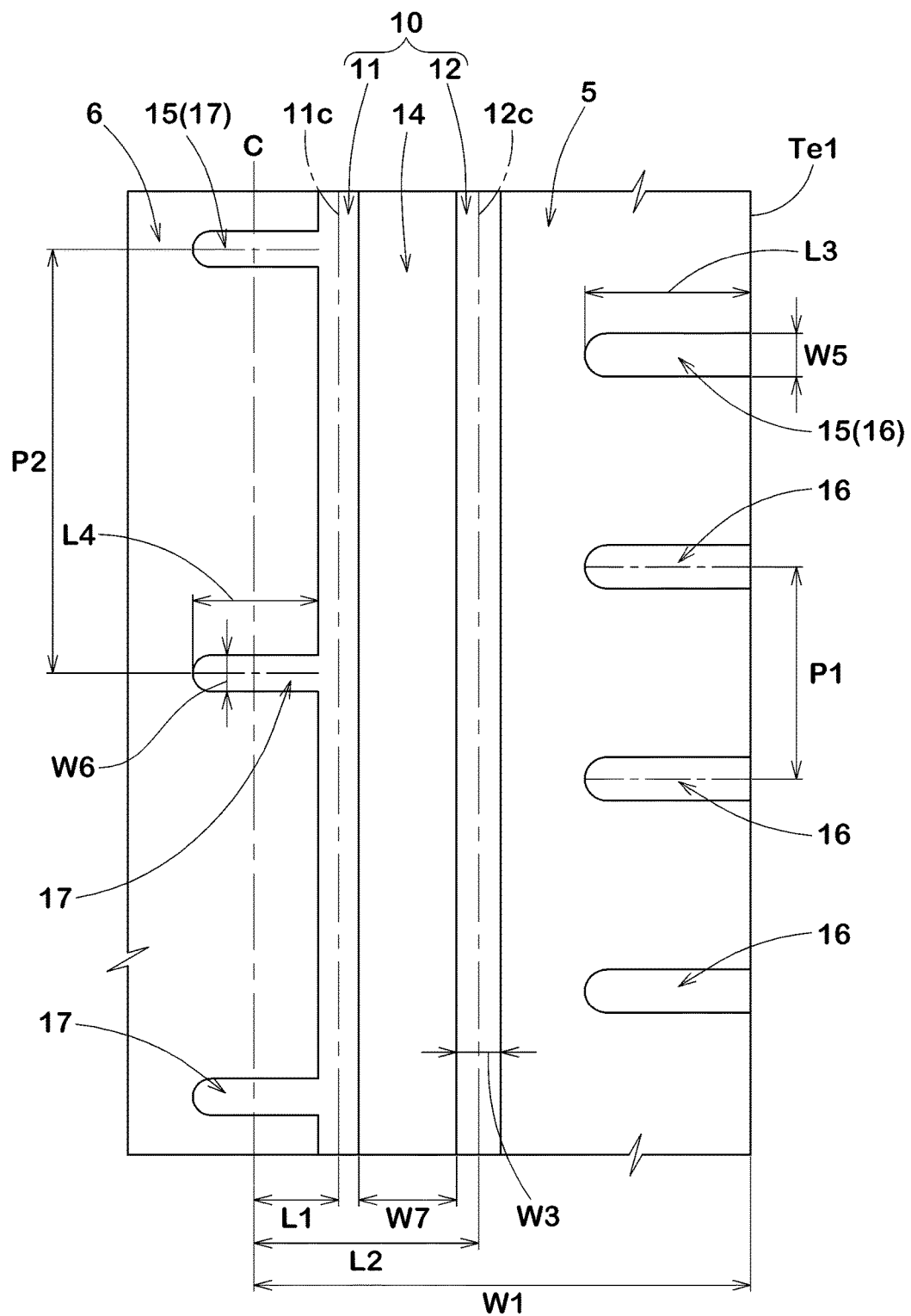
FIG. 2 is an enlarged view of an inboard portion of FIG. 1.

FIG. 2 illustrates an enlarged view of the inboard portion of FIG. 1. As illustrated in FIG. 2, the inboard portion 5 is provided with at least one circumferentially and continuously extending main groove 10. In this embodiment, the at least one main groove 10, for example, extends in a straight manner along the circumferential direction of the tire with a constant width. Alternatively, the main groove 10 extends in a zigzag or wavy manner, and may have a varying width.

The at least one main groove 10 includes a first main groove 11 disposed on the side of the tire equator C and a second main groove 12 disposed between the first main groove 11 and the inboard tread edge Te1. The first main groove 11 and the second main groove 12 can hold the water in them and drain rearwardly of the tire to improve wet grip performance of the tire upon traveling on wet road.

An axial distance L1 from the tire equator C to the groove centerline 11c of the first main groove 11, for example, is preferably equal to or more than 0.10 times, more preferably equal to or more than 0.15 times, but preferably equal to or less than 0.25 times, more preferably equal to or less than 0.20 times the axial width W1 of the inboard portion 5. Such a first main groove 11 may drain water from near the tire equator C in the contact patch upon traveling on wet road. Note that the axial width W1 of the inboard portion 5 means an axial distance between the tire equator C and the inboard tread edge Te1.

An axial distance L2 from the tire equator C to the groove centerline 12c of the second main groove 12 is preferably in a range of from 0.35 to 0.75 times the axial width W1 of the inboard portion 5 in order to optimize the location of the second main groove 12 so as to balance a pattern rigidity near the tire equator C with a pattern rigidity near the inboard tread edge Te1. Thus, uneven wear of a portion near the tire equator C as well as a portion near the inboard tread edge Te1 can be prevented effectively.

In order to further improve the above mentioned effects, the axial distance L2 is preferably equal to or more than 0.40 times, more preferably equal to or more than 0.45 times, but preferably equal to or less than 0.65 times, more preferably equal to or less than 0.50 times the axial width W1.

In order to improve the wet performance while ensuring the pattern rigidity of the tire, groove widths W3 of the main grooves 11 and 12 are preferably in a range of from 9.0 to 15.0 mm. Preferably, the groove depths of the main grooves 11 and 12, for example, are in a range of from 5.0 to 6.0 mm. However, note that the groove widths W3 and depths of the main grooves 11 and 12 are not particularly limited to the above ranges.

Preferably, the inboard portion 5, for example, includes a plain rib 14 between the first main groove 11 and the second main groove 12, and the plain rib 14 is not provided with any grooves nor sipes. The plain rib 14 would be useful to improve steering stability in cornering on a race circuit since it has high rigidity. Preferably, the plain rib 14 has an axial width W7 equal to or more than 2 mm.

In a preferred embodiment, the axial width W7 of the plain rib 14 is preferably equal to or more than 0.15 times, more preferably equal to or more than 0.18 times, but preferably equal to or less than 0.25 times, more preferably equal to or less than 0.22 times the axial width W1 of the inboard portion 5. The plain rib 17 may be useful to improve steering stability in cornering while ensuring wet performance of the tire.

In a preferred embodiment, the inboard portion 5 may be provided with at least one lateral groove 15 in addition to the main grooves 10. The at least one lateral groove 15, for example, may include a plurality of first lateral grooves 16 disposed on the side of the inboard tread edge Te1.

The first lateral grooves 16, for example, extend axially inwardly from the inboard tread edge Te1 and terminate without reaching the second main groove 12. The first lateral grooves 16 can improve wet performance while ensuring rigidity of a portion between the inboard tread edge Te1 and the second main groove 12.

Preferably, the first lateral grooves 16 extend straightly along the axial direction of the tire in order to prevent heel and toe wear on a land portion between adjacent first lateral grooves 16.

Preferably, the groove widths W5 of the first lateral grooves 16 are in a range of from 9.0 to 15.0 mm in order to further improve wet performance while ensuring pattern rigidity of the tread portion 2. Preferably, the groove depths of the first lateral grooves are in a range of from 5.0 to 6.0 mm. Note that the groove widths W5 and the groove depths are not particularly limited to the above ranges.

From the same point of view, the axial lengths L3 of the first lateral grooves 16 are preferably equal to or more than 0.25 times, more preferably equal to or more than 0.30 times, but preferably equal to or less than 0.40 times, more preferably equal to or less than 0.35 times the axial width W1 of the inboard portion 5.

In this embodiment circumferential pitches P1 of the first lateral grooves 16, for example, are set in a range of from 0.35 to 0.45 times the axial width W1 of the inboard portion 5.

The at least one lateral groove 15 may include a plurality of second lateral grooves 17 disposed on the side of the tire equator C in addition to the first lateral grooves 16. The second lateral grooves 17, for example, extend toward the outboard tread edge Te2 from the first main groove 11. In this embodiment, the second lateral grooves 17, for example, extend across the tire equator C and terminate within the outboard portion 6. The second lateral grooves 17 can also improve wet performance as well as heat radiation property of a tread portion on or near the tire equator C so as to prevent reduction of grip which may be caused by excessive heat buildup of the tread rubber.

In this embodiment, the second lateral grooves 17, for example, extend straightly along the axial direction of the tire in order to prevent heel and toe wear on a land portion between adjacent second lateral grooves 17. Alternatively, the second lateral grooves 17 may be inclined at an angle with respect to the axial direction of the tire. In this case, the angle of the second lateral grooves 17 is preferably in a range of equal to or less than 45 degrees.

Preferably, the groove widths W6 of the second lateral grooves 17, for example, may be smaller than the groove widths W5 of the first lateral grooves 16. Thus, the tread rigidity on or near the tire equator C can be ensured to improve steering stability in cornering when traveling on a race circuit. In a preferred embodiment, the groove widths W6 of the second lateral grooves 17 may be set in a range of from 0.80 to 0.90 times the groove widths W5 of the first lateral grooves 16. Such a second lateral groove 17 may improve wet performance and steering stability in a good balance.

From the same point of view, the axial lengths L4 of the second lateral grooves 17, for example, are preferably smaller than the axial lengths L3 of the first lateral grooves 16. In a preferred embodiment, the axial lengths L4 of the second lateral grooves 17 are preferably equal to or less than 0.85 times, more preferably equal to or less than 0.80 times, but preferably equal to or more than 0.65 times, more preferably equal to or more than 0.70 times the axial lengths L3 of the first lateral grooves 16.

Preferably, circumferential pitches P2 of the second lateral grooves 17 are greater than the circumferential pitches P1 of the first lateral grooves 16. In a preferred embodiment, the circumferential pitches P2 of the second lateral grooves 17 are preferably equal to or more than 1.85 times, more preferably equal to or more than 1.95 times, but preferably equal to or less than 2.15 times, more preferably equal to or less than 2.05 times the circumferential pitches P1 of the first lateral grooves 16. The second lateral grooves 17 can improve wet performance while ensuring tread rigidity on or near the tire equator C to improve steering stability in cornering on a race circuit for example.

As illustrated in FIG. 1, the outboard portion 6 is not provided with any circumferentially and continuously extending main grooves. Thus, the outboard portion 6 may ensure high rigidity to offer large frictional force upon cornering at high speeds on a circuit.

In a preferred embodiment, the outboard portion 6 is configured as a slick pattern that is not provided with any grooves nor sipes except the second lateral grooves 17. Such an outboard portion 6 can further offer excellent grip performance as well as cornering performance of the tire.

Figure 3:
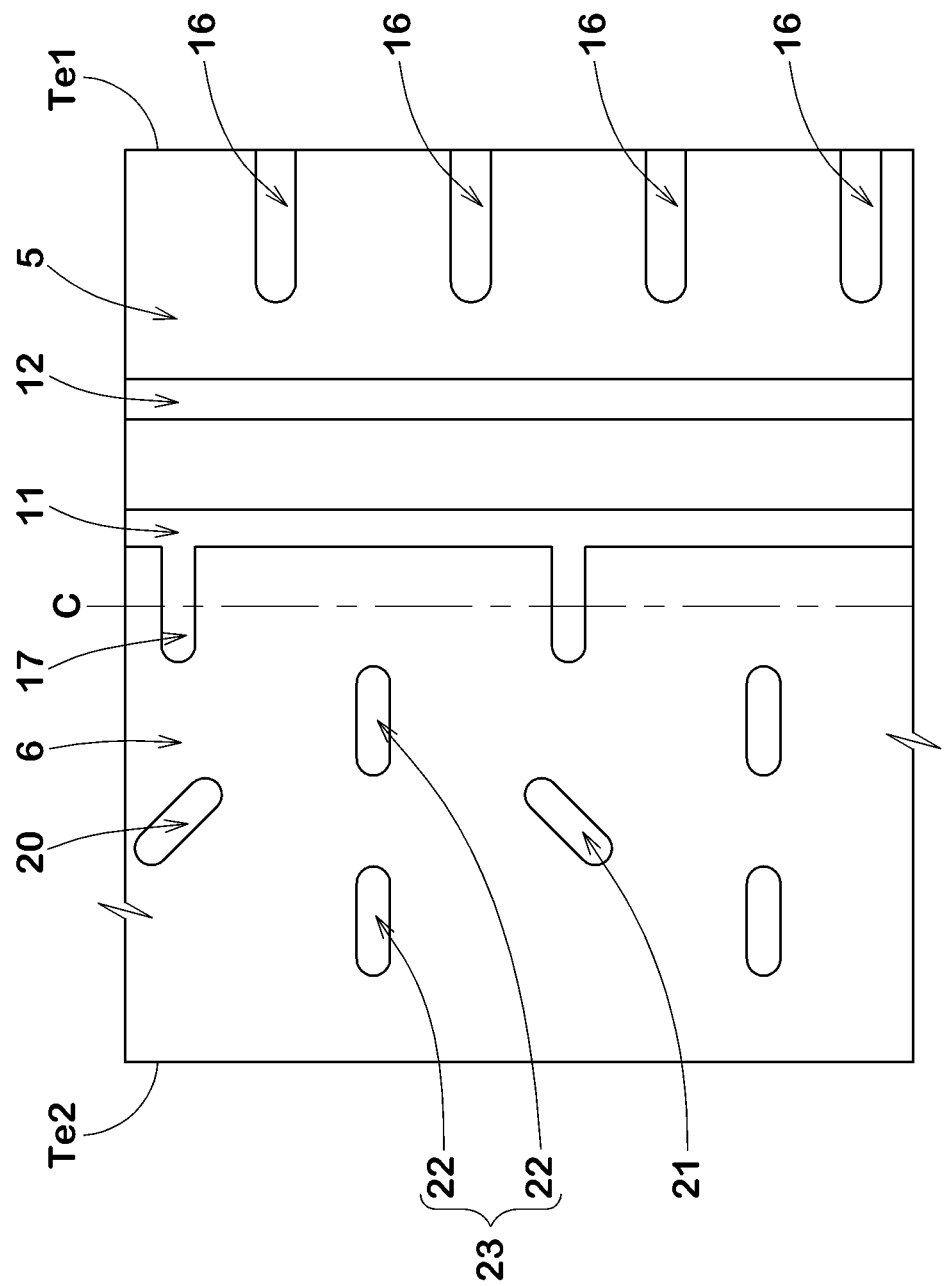
FIG. 3 is a development view of a tread portion of a pneumatic tire according to another embodiment of the present invention.
Figure 4:
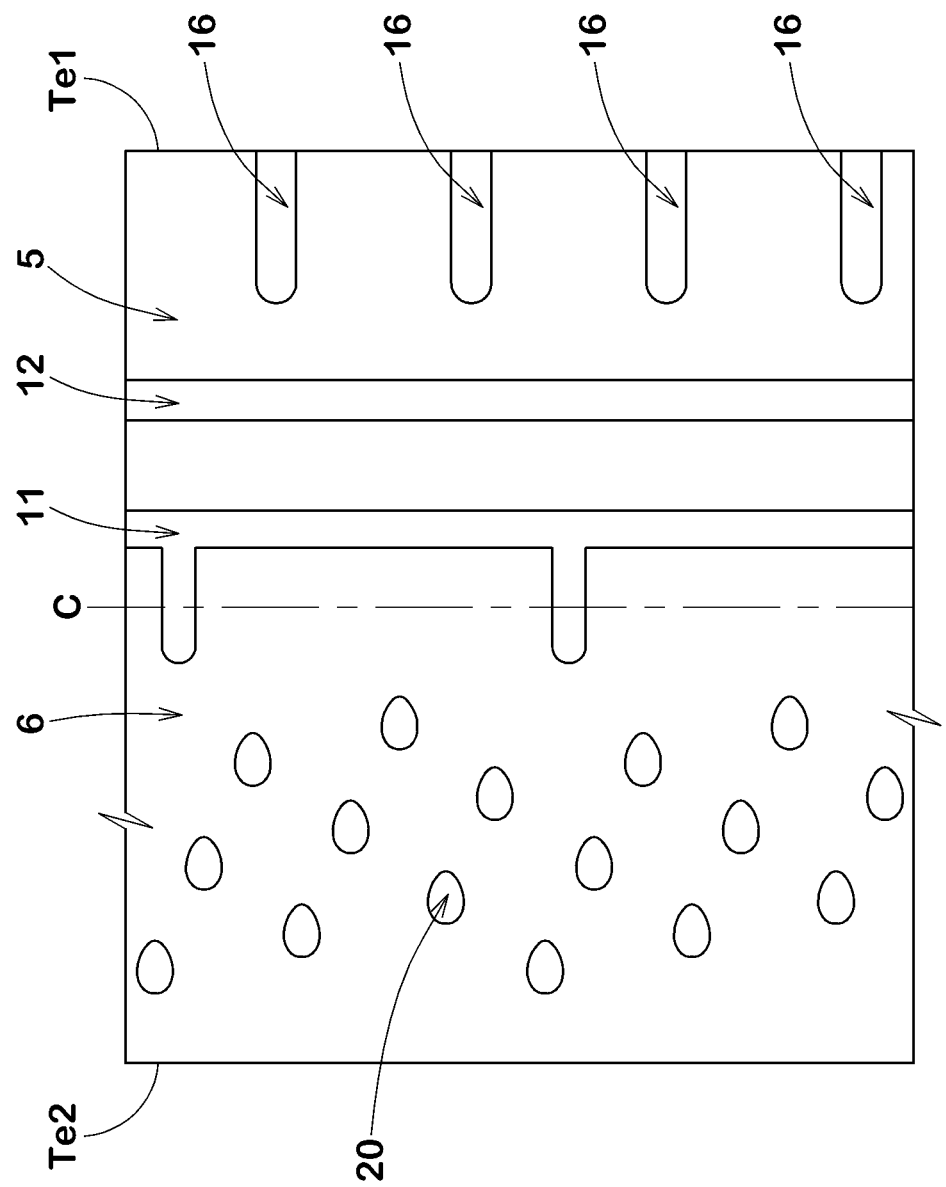
FIG. 4 is a development view of a tread portion of a pneumatic tire according to yet another embodiment of the present invention.

FIG. 3 and FIG. 4 each illustrate a development view of the tread portion 2 of a pneumatic tire according to another embodiment of the present invention. Note that elements which have already been described above are denoted by the same reference numbers in FIGS. 3 and 4. The embodiments illustrated in FIGS. 3 and 4 includes the outboard portion 6 provided with a plurality of recesses 20 which can improve heat radiation property of the outboard portion 6 so as not to reduce grip.

In FIG. 3, the recesses 20 have a long ellipse or an oval shaped edge wherein the edge has two semicircles coupled through two line segments, for example. Such a recess 20 may improve not only heat radiation property of the outboard portion 6 but also wet performance of the tire.

In this embodiment, the recesses 20, for example, include a plurality of first recesses 21 inclining at an angle with respect to the axial direction of the tire and a plurality of second recesses 22 extending along the axial direction of the tire.

In a preferred embodiment, the first recesses 21 are disposed axially outwardly of the terminal ends of the second lateral grooves 17. The second recesses 22, for example, include a group 23 of second recesses 22 which are aligned in the axial direction of the tire. The group 23 is preferably arranged at a location between circumferentially adjacent second lateral grooves 17 and 17. In this embodiment, one first recesses 21 and the group 23 of second recesses 22 are arranged alternately in the circumferential direction of the tire in order to further improve heat radiation property of the outboard portion 6.

In the embodiment illustrated in FIG. 4, the recesses 20, for example, have a long ellipse or an oval shaped edge wherein the edge does not include a line segments so as to form an egg shape, for example. In this embodiment, the recesses 20 have an edge shape having the axial length greater than the circumferential length. Such a recess 20 may improve heat radiation property of the outboard portion 6 while ensuring axial rigidity thereof.

While the particularly preferable embodiments in accordance with the present invention have been described in detail, the present invention is not limited to the illustrated embodiments, but can be modified and carried out in various aspects.

EXAMPLE

Figure 5:
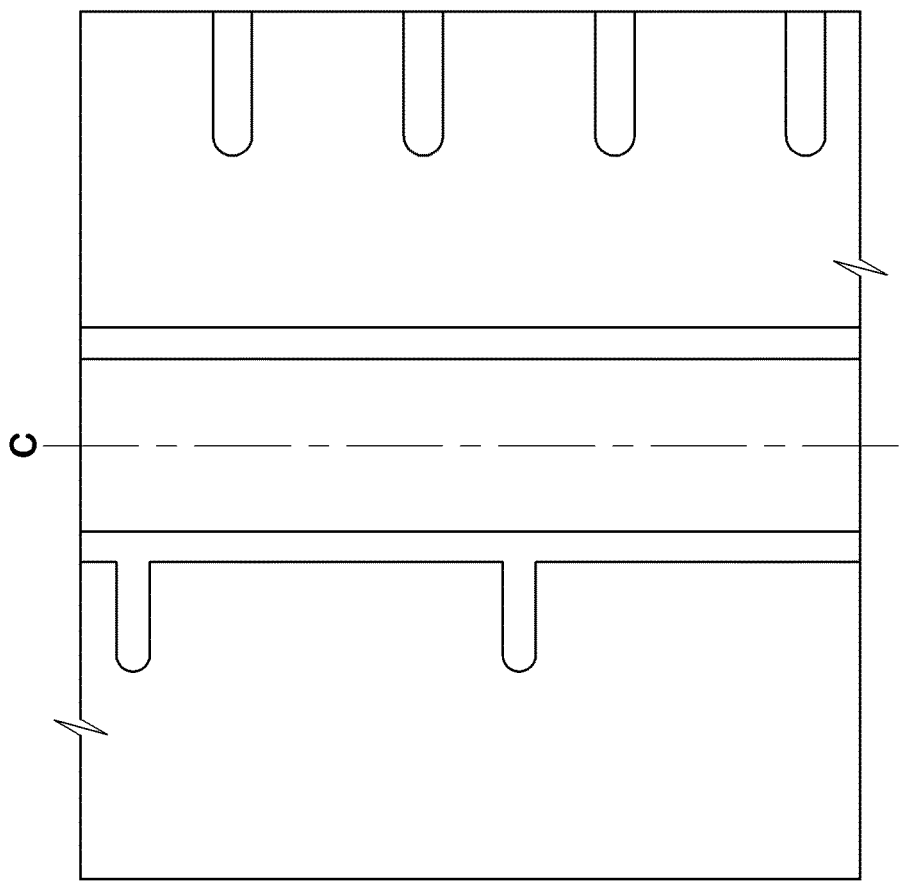
FIG. 5 is a development view of a tread portion of a pneumatic tire according to a comparative example.

Pneumatic tires (205/55R16) having a basic tread pattern illustrated in FIGS. 1, 3 and 4 were manufactured based on the detail shown in Table 1. As Ref. 1 of a comparative example, a pneumatic tire that includes the outboard portion provided with a main groove was also manufactured as illustrated in FIG. 5. As Refs. 2 and 3 of a comparative example, pneumatic tires, which includes the second main groove disposed at a location that does not satisfy the claimed range, were also manufactured. Then, steering stability, wet performance and uneven wear resistance of each tire was tested. Common specification and test method are as follows:

Rim size: 16×7.0 JJ
Tire inner pressure: 200 kPa
Steering Stability (Cornering Performance) Test:

Each test tire was mounted on a test FR vehicle having a displacement of 2,000 cc as the all wheels, and then a driver drove the above mentioned test vehicle on a circuit with a dry asphalt surface to evaluate the steering stability by his sense. The test results are shown with an index base on Ref. 1 being 100. The larger the value, the better the performance is.

Wet Performance Test:

Using an inside drum tester, each test tire was run on a drum surface with a water puddle of 5.0 mm deep at a slip angle 1.0 degree with tire load of 4.2 kN, and a speed at which a hydroplaning phenomenon is caused was measured.

The test results are shown with an index base on Ref. 1 being 100. The larger the value, the better the performance is.

Uneven Wear Resistance Test:

After the above mentioned test vehicle traveled for a certain distance, the wear amount difference between locations of the tire equator and the inboard tread edge was measured. The test results are shown with an index base on Ref. 1 being 100. The smaller the value, the better the performance is.

Test results are shown in Table 1. From the test results, it is confirmed that the example tires have improved wet performance, uneven wear resistance and steering stability in good balance.

TABLE 1

|  | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Tread pattern | FIG. 5 | FIG. 1 | FIG. 1 | FIG. 1 | FIG. 1 | FIG. 1 | FIG. 1 | FIG. 1 | FIG. 1 |
| Ratio L1/W1 | — | 0.17 | 0.17 | 0.17 | 0.17 | 0.17 | 0.17 | 0.17 | 0.17 |
| Ratio L2/W1 | — | 0.3 | 0.8 | 0.45 | 0.35 | 0.4 | 0.5 | 0.65 | 0.75 |
| Ratio L4/L3 | — | 0.75 | 0.75 | 0.75 | 0.75 | 0.75 | 0.75 | 0.75 | 0.75 |
| Ratio P2/P1 | — | 2.0 | 2.0 | 2.0 | 2.0 | 2.0 | 2.0 | 2.0 | 2.0 |
| Steering stability (index) | 100 | 103 | 104 | 106 | 104 | 105 | 106 | 106 | 105 |
| Wet performance (index) | 100 | 102 | 100 | 102 | 103 | 103 | 101 | 101 | 101 |
| Uneven wear resistance (index) | 100 | 104 | 103 | 95 | 97 | 95 | 95 | 96 | 98 |

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| Tread pattern | FIG. 1 | FIG. 1 | FIG. 1 | FIG. 1 | FIG. 1 | FIG. 1 | FIG. 3 | FIG. 4 |
| Ratio L1/W1 | 0.12 | 0.28 | 0.17 | 0.17 | 0.17 | 0.17 | 0.17 | 0.17 |
| Ratio L2/W1 | 0.45 | 0.45 | 0.45 | 0.45 | 0.45 | 0.45 | 0.45 | 0.45 |
| Ratio L4/L3 | 0.75 | 0.75 | 0.9 | 1 | 0.75 | 0.75 | 0.75 | 0.75 |
| Ratio P2/P1 | 2.0 | 2.0 | 2.0 | 2.0 | 1.5 | 1.0 | 2.0 | 2.0 |
| Steering stability (index) | 105 | 106 | 105 | 104 | 104 | 103 | 104 | 105 |
| Wet performance (index) | 103 | 101 | 103 | 104 | 103 | 104 | 103 | 102 |
| Uneven wear resistance (index) | 97 | 97 | 97 | 98 | 97 | 98 | 95 | 95 |

What is claimed is:

1. A pneumatic tire comprising:
a tread portion having a designated installing direction to a vehicle to define an outboard tread edge and an inboard tread edge, the tread portion comprising an inboard portion defined between the inboard tread edge and a tire equator and an outboard portion defined between the outboard tread edge and the tire equator,
the inboard portion being provided with a circumferentially and continuously extending first main groove and a circumferentially and continuously extending second main groove arranged between the first main groove and the inboard tread edge;
wherein the tread portion is further provided with a plurality of second lateral grooves each having one end in communication with the first main groove and the other end terminating within the outboard portion;
wherein the inboard portion comprises a plain rib between the first main groove and the second main groove, and the plain rib is not provided with any grooves nor sipes;
an axial distance from the tire equator to a centerline of the second main groove being in a range of from 0.35 to 0.75 times of a width of the inboard portion; and
the outboard portion being provided with a plurality of recesses such that the plurality of recesses is not in communication with each other directly or indirectly, wherein the outboard portion is not provided with any circumferentially and continuously extending main grooves,
wherein the outboard portion comprises a pattern that is not provided with any grooves nor sipes except the second lateral grooves and the plurality of recesses.

2. The pneumatic tire according to claim 1, wherein the inboard portion is provided with a plurality of first lateral grooves extending axially inwardly from the inboard tread edge and terminating without reaching the second main groove.

3. The pneumatic tire according to claim 2, wherein the first lateral grooves extend straightly along an axial direction of the tire.

4. The pneumatic tire according to claim 2, wherein
the second lateral grooves are arranged at circumferential pitches greater than circumferential pitches of the first lateral grooves, wherein the circumferential pitches of the second lateral grooves are defined between directly adjacent second lateral grooves, and wherein the circumferential pitches of the first lateral grooves are defined between directly adjacent first lateral grooves.

5. The pneumatic tire according to claim 2, wherein the second lateral grooves have axial lengths smaller than axial lengths of the first lateral grooves.

6. The pneumatic tire according to claim 1, wherein the second lateral grooves extend straightly along an axial direction of the tire.

7. The pneumatic tire according to claim 1, wherein the second lateral grooves extend straightly in parallel with an axial direction of the tire.

8. The pneumatic tire according to claim 1, wherein the plurality of recesses includes a plurality of first recesses inclining at an angle with respect to the axial direction of the tire.

9. The pneumatic tire according to claim 1, wherein the plurality of recesses includes a plurality of second recesses extending in parallel with the axial direction of the tire.

10. A pneumatic tire comprising:
a tread portion having a designated installing direction to a vehicle to define an outboard tread edge and an inboard tread edge, the tread portion comprising an inboard portion defined between the inboard tread edge and a tire equator and an outboard portion defined between the outboard tread edge and the tire equator;
the inboard portion being provided with a circumferentially and continuously extending first main groove and a circumferentially and continuously extending second main groove arranged between the first main groove and the inboard tread edge; and an axial distance from the tire equator to a centerline of the second main groove being in a range of from 0.35 to 0.75 times of a width of the inboard portion;

wherein the tread portion is further provided with a plurality of second lateral grooves each having one end in communication with the first main groove and the other end terminating within the outboard portion, and wherein the outboard portion comprises a slick pattern that is not provided with any grooves nor sipes except the second lateral grooves.

11. A pneumatic tire comprising:

a tread portion having a designated installing direction to a vehicle to define an outboard tread edge and an inboard tread edge, the tread portion comprising an inboard portion defined between the inboard tread edge and a tire equator and an outboard portion defined between the outboard tread edge and the tire equator, the inboard portion being provided with a circumferentially and continuously extending first main groove and a circumferentially and continuously extending second main groove arranged between the first main groove and the inboard tread edge;

wherein the tread portion is further provided with a plurality of second lateral grooves each having one end in communication with the first main groove and the other end terminating within the outboard portion, wherein the second lateral grooves extend straightly in parallel with an axial direction of the tire;

an axial distance from the tire equator to a centerline of the second main groove being in a range of from 0.35 to 0.75 times of a width of the inboard portion; and the outboard portion being provided with a plurality of recesses such that the plurality of recesses is not in communication with each other directly or indirectly, wherein the outboard portion is not provided with any circumferentially and continuously extending main grooves.

12. A pneumatic tire comprising:

a tread portion having a designated installing direction to a vehicle to define an outboard tread edge and an inboard tread edge, the tread portion comprising an inboard portion defined between the inboard tread edge and a tire equator and an outboard portion defined between the outboard tread edge and the tire equator, the inboard portion being provided with a circumferentially and continuously extending first main groove and a circumferentially and continuously extending second main groove arranged between the first main groove and the inboard tread edge;

wherein the tread portion is further provided with a plurality of second lateral grooves each having one end in communication with the first main groove and the other end terminating within the outboard portion;

wherein the inboard portion is provided with a plurality of first lateral grooves extending axially inwardly from the inboard tread edge and terminating without reaching the second main groove;

wherein the second lateral grooves are arranged at circumferential pitches greater than circumferential pitches of the first lateral grooves, wherein the circumferential pitches of the second lateral grooves are defined between directly adjacent second lateral grooves, and wherein the circumferential pitches of the first lateral grooves are defined between directly adjacent first lateral grooves;

an axial distance from the tire equator to a centerline of the second main groove being in a range of from 0.35 to 0.75 times of a width of the inboard portion; and the outboard portion being provided with a plurality of recesses such that the plurality of recesses is not in communication with each other directly or indirectly, wherein the outboard portion is not provided with any circumferentially and continuously extending main grooves, wherein the outboard portion comprises a pattern that is not provided with any grooves nor sipes except the second lateral grooves and the plurality of recesses.

* * * * *